United States Patent [19]
Hochet

[11] Patent Number: 6,050,630
[45] Date of Patent: Apr. 18, 2000

[54] MOLDED COMPOSITE STACK

[75] Inventor: Nicolas Hochet, Le Lion d'Angers, France

[73] Assignee: Peguform France, France

[21] Appl. No.: 08/808,186

[22] Filed: Feb. 28, 1997

[30] Foreign Application Priority Data

Mar. 4, 1996 [FR] France ................................. 96 02684

[51] Int. Cl.[7] ........................................ B60J 7/00
[52] U.S. Cl. ............................................ 296/187; 296/1.1
[58] Field of Search ..................... 297/452.55, 452.41, 297/452.23, 452.24, 452.25, 452.57; 428/83; 296/37.14, 37.15, 37.16, 1.1, 191, 187

[56] References Cited

U.S. PATENT DOCUMENTS

| | | |
|---|---|---|
| 1,964,903 | 7/1934 | Bronson . |
| 3,196,533 | 7/1965 | Ida et al. ............................. 29/421 |
| 3,995,984 | 12/1976 | Fetherston et al. .................. 425/521 |
| 5,522,645 | 6/1996 | Dahlbacka ........................ 297/452.55 |
| 5,544,942 | 8/1996 | Vu Khac et al. . |

FOREIGN PATENT DOCUMENTS

| | | | |
|---|---|---|---|
| 0 649 736 | 10/1994 | European Pat. Off. | .......... B32B 3/12 |
| 34 44 321 | 5/1984 | Germany | ........................ B29C 55/02 |
| 41 18 286 | 6/1991 | Germany | ........................ B32B 3/12 |

OTHER PUBLICATIONS

Patent Abstracts of Japan, vol. 007, No. 016 (M–187), Jan. 22, 1983.

*Primary Examiner*—Milton Nelson, Jr.
*Attorney, Agent, or Firm*—Blakely Sokoloff Taylor & Zafman

[57] ABSTRACT

The molded composition stack part (44) for a vehicle includes a stack including a cellular core sandwiched between a first face (46) and a second face (48). The part also has a curved surface zone (50) contiguous with the first face (48) and with a rim (54) of the part, and has a trough (52) extending in the second face (48) in the vicinity of the rim towards the first face. The part is characterized in that the rim (54) has a plane external side face (57) that is perpendicular to the first face (46), and that extends in alignment with the curved surface zone (50).

13 Claims, 6 Drawing Sheets

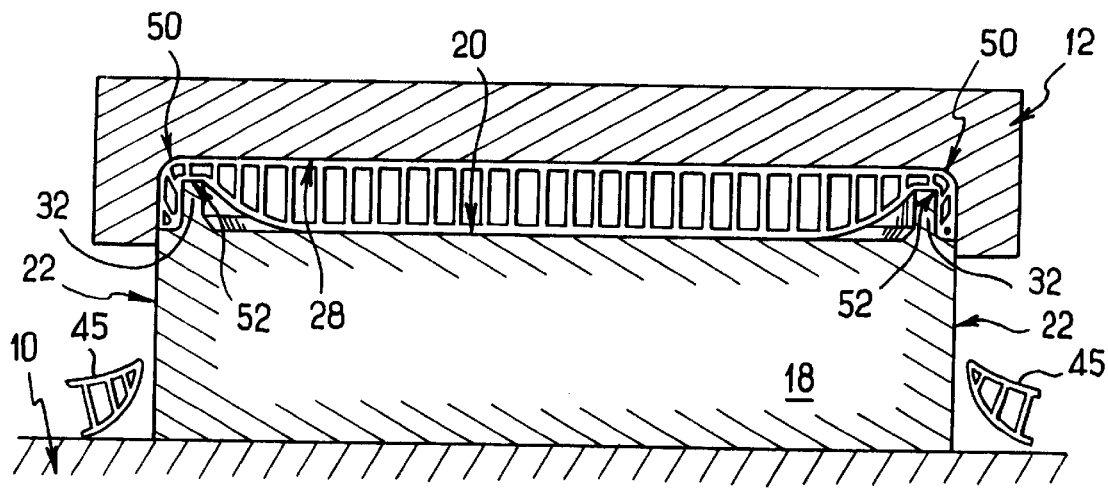
FIG._4
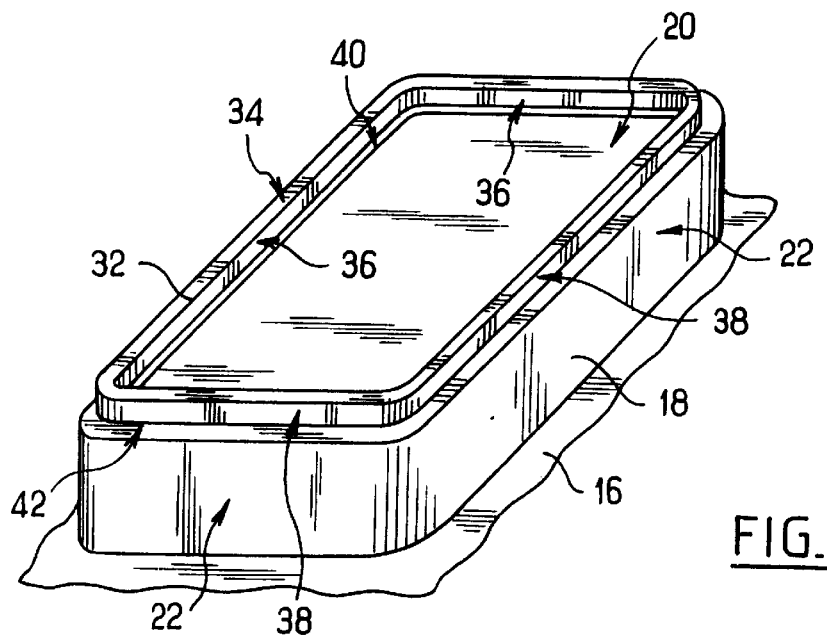
FIG._5
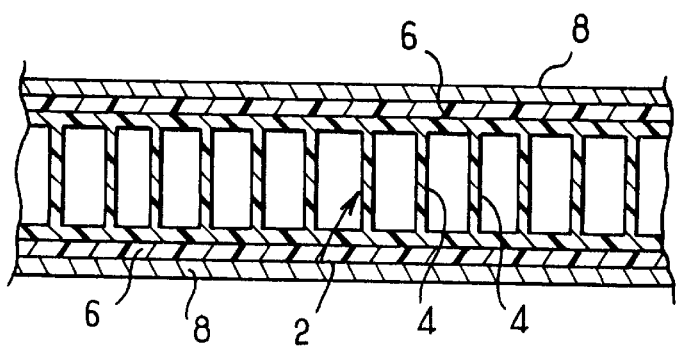
FIG._6

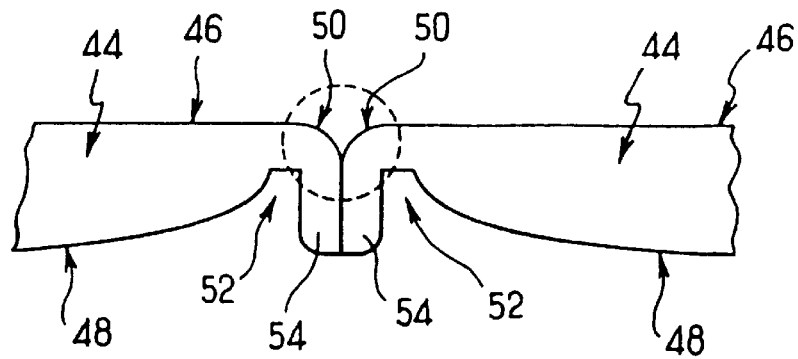
FIG_10
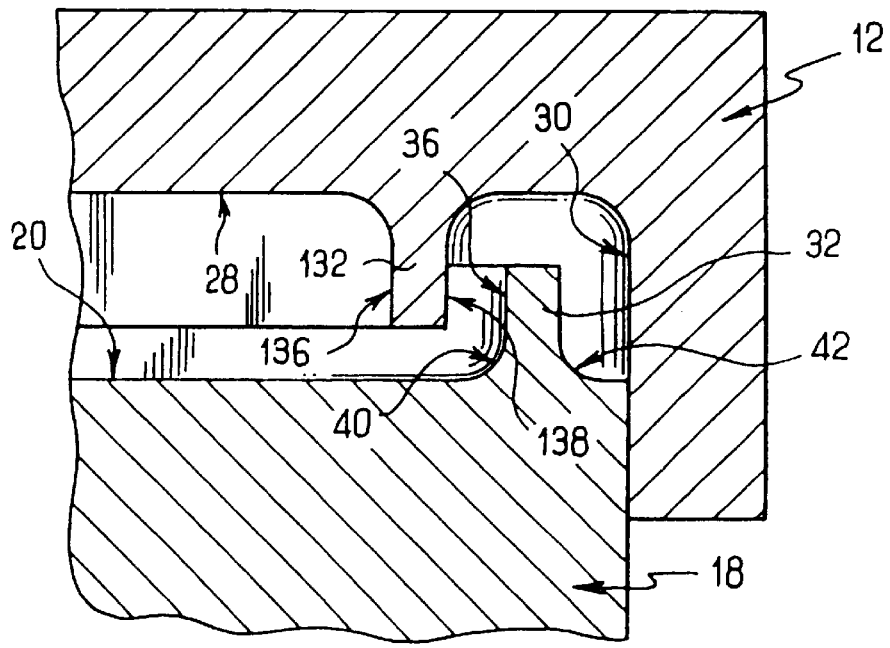
FIG_11
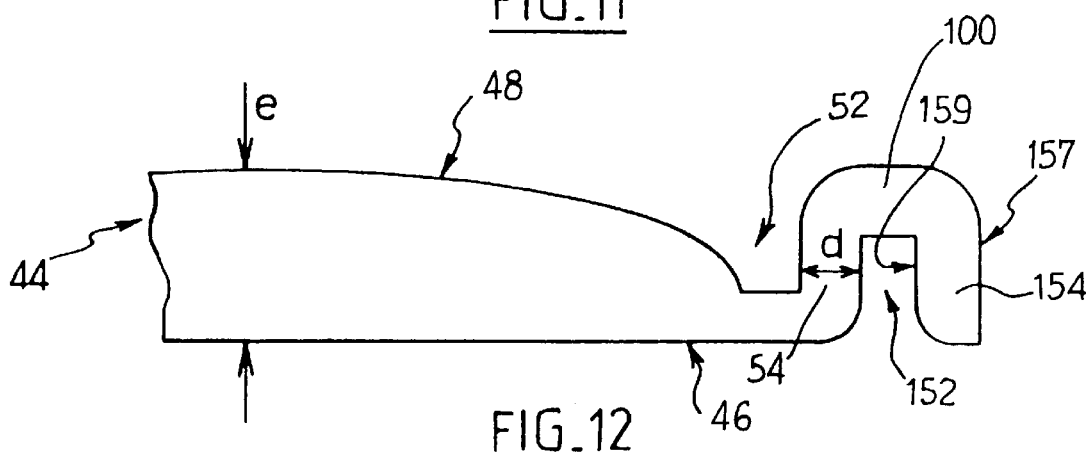
FIG_12

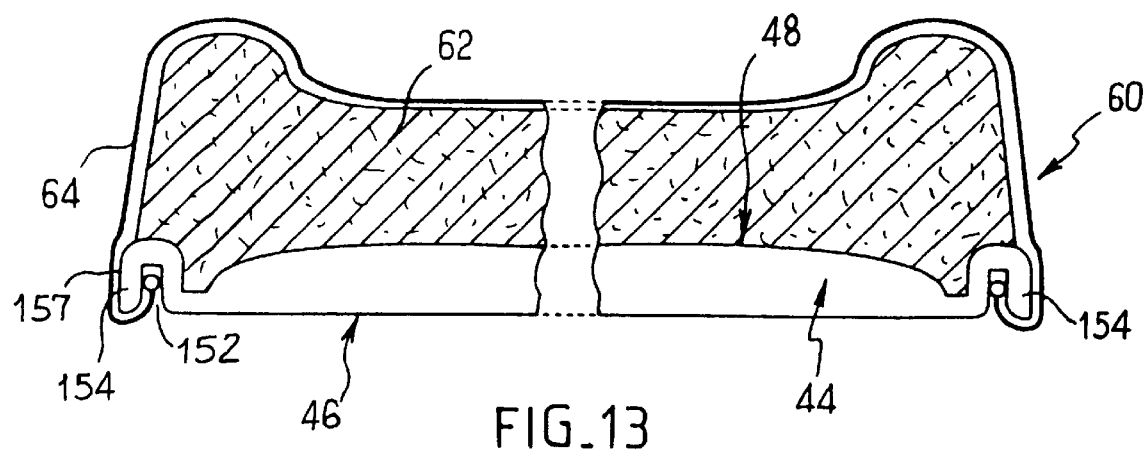
FIG_13
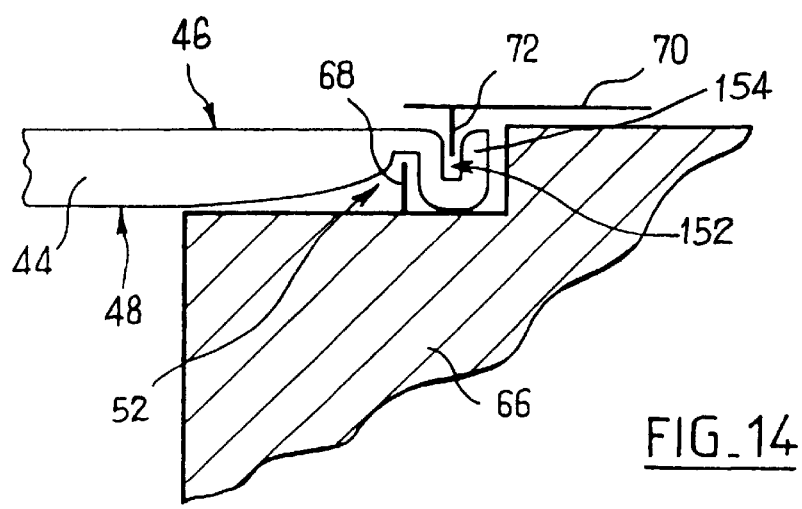
FIG_14
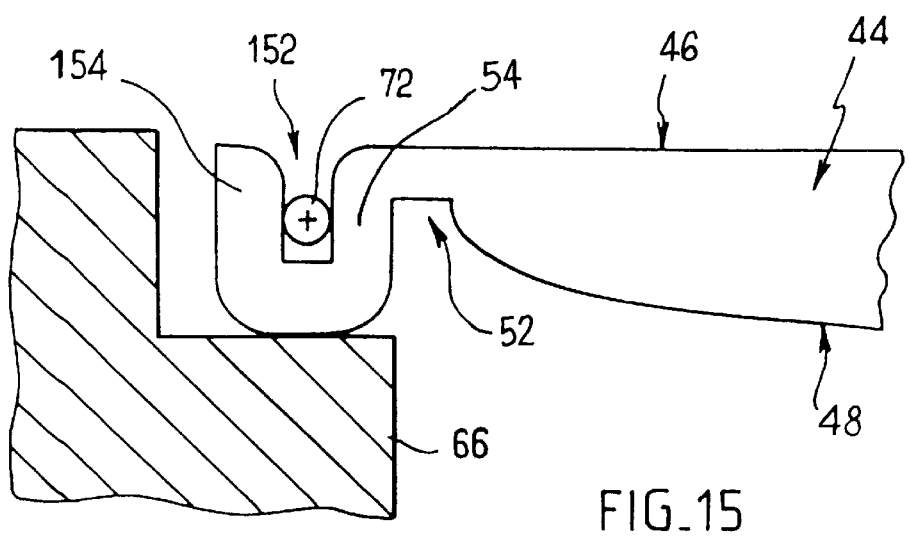
FIG_15

MOLDED COMPOSITE STACK

BACKGROUND OF THE INVENTION

1. Field of the Invention

The present invention relates to molds for forming composite stacks having cellular cores, and to parts made by means of such molds.

2. Background Information

Document DE-3 444 321 discloses a mold for forming a stack including a cellular core. The mold comprises a punch and a die that are mounted so as to move relative to each other. The stack to be formed is disposed between the punch and the die. Bringing the punch and the die together subjects the stack to hot pressing so as in particular to fix together the various layers of the stack. The punch has a projection having a leading face that is plane and that is provided with pieces of relief having curved faces and projecting from the projection. The die is provided with a cavity suitable for receiving the projection together with the pieces of relief. During pressing, the projection and the pieces of relief crush and deform certain zones of the stack. After forming, the part is substantially plane in overall shape from one margin of the part to the other, the margins having been crushed in the direction of their thickness, the faces of the part having curved zones with small radii of curvature that are different from one face to the other. This type of part can be used in numerous fields of industry, e.g. in the automobile industry. The cellular core, e.g. a honeycombed core, enables the part to be very rigid while being of moderate weight.

Unfortunately, a part formed in that way has a crushed margin whose edge constitutes the periphery of the part is inaccurately and non-uniformly shaped and can be seen on both sides of the part. Such a margin spoils the appearance of the part, it is bulky, it is relatively fragile, and it does not enable the part to be subsequently positioned reliably in abutment against an element in its environment.

An object of the invention is to provide a mold making it possible to form a part of the above-mentioned type while giving it a margin that is acceptable in appearance, that is more compact, that is more robust, and that facilitates subsequent positioning of the part.

To achieve this object, the invention provides a mold for forming a stack including a cellular core, the mold comprising a punch and a die that are mounted to slide relative to each other in a sliding direction;

the punch including a projection having a substantially plane leading face perpendicular to the sliding direction, and at least one piece of relief projecting from said face;

the die being provided with a cavity suitable for receiving the projection, and having a substantially plane end wall parallel to the leading face and suitable for extending facing said leading face, the cavity having a side face and a curved surface zone extending between the end wall and the side face; and the piece of relief being disposed to extend in the vicinity of the curved surface zone and in the vicinity of the side face when the projection is received in the cavity;

the side face of the cavity being plane and perpendicular to the end wall.

On bringing the two portions of the mold together to form a part, the projecting piece of relief stresses and crushes the composite stack locally so as to force it to match the shape of the curved surface zone of the cavity. Even if the radius of curvature of the curved surface zone is very small, a curved surface zone is obtained on the part that has the same radius of curvature. For example, the curved surface zone of the cavity may be given a radius of curvature that is less than the thickness of the part, so as to obtain a zone on the part that has a radius of curvature less than said thickness.

In addition, the plane side face of the cavity cooperates with the piece of relief to deform locally and cause the margin of the stack including the cellular core to fold down so as to define on said margin a plane external side face that is perpendicular to the general plane of the part and that extends in alignment with the curved surface zone. This configuration of the external side face of the margin hides the edge of the part from view looking from the side of the part, thereby improving the appearance of the part, in particular as seen from said side. In addition, the margin formed in this way is compact. Furthermore, the margin is more robust. Moreover, the external face of the margin has a position that is accurately defined and reproducible, and it can be used to position the part in abutment relative to another element, without or prior to fixing the part to said element.

The side face makes it possible, for example, to bring the part and another element together so that the join is acceptable in appearance because of the curved surface zone, and so as to guarantee correct positioning of the part. Furthermore, the piece of relief defines a trough that is contiguous with the piece of relief.

Advantageously, the piece of relief has a plane external side face perpendicular to the leading face and suitable for extending facing the side face of the cavity when the projection is received in the cavity.

Thus, the mold is suitable for pressing the margin of the stack including the cellular core between the side face of the projection and the side face of the piece of relief, both faces being plane, parallel to each other, and perpendicular to the end wall. The margin can thus be pressed or crushed in a direction that is perpendicular to the general plane of the part, thereby reducing its thickness in this direction. In this way, the internal face of the margin is given a plane accurate shape perpendicular to the end wall, so that said internal face can be used as a reference for positioning an element in the trough defined in the part by said margin, and formed by the piece of relief.

Advantageously, the piece of relief is disposed so that, when the projection is received in the cavity, the piece of relief is separated from the side face of the cavity by a distance less than the height of the piece of relief.

Advantageously, the projection has a plane side face parallel to the side face of the cavity and suitable for coming into contact with said side face of the cavity when the projection is received in the cavity.

Thus, the two faces coming into contact with each other produces a shearing effect, thereby shearing off the surplus portions of stack and in particular the cellular core extending beyond the margin of the part. This shearing-off takes place at the same time as the forming of the part, so that the forming masks at least in part any trace of the shearing on the edge of the part. Since the forming step and the shearing-off step are simultaneous, the method of manufacturing the part is faster.

Advantageously, the die is provided with a piece of relief projecting from the end wall and suitable for extending in the vicinity of the piece of relief on the projection when the projection is received in the cavity, so that the piece of relief on the projection is interposed between the piece of relief in the cavity and the side face of the cavity.

Thus, the piece of relief in the cavity and the piece of relief on the projection co-operate with each other to crush between them the stack including the cellular core. As a result, the cellular core matches more accurately the shape of the first piece of relief on the projection, so that the trough defined by said first piece of relief has a more accurate and reproducible shape. The trough can thus be used for numerous mechanical applications, e.g. for abutting against or receiving an element. In addition, the piece of relief in the cavity defines a second trough in the face of the part that is opposite from the face carrying the first trough.

Advantageously, the projection is provided with a second piece of relief projecting from the leading face and disposed in the vicinity of the first piece of relief on the projection so that, when the projection is received in the cavity, the piece of relief of the cavity is interposed between the two pieces of relief of the projection.

Thus, the second piece of relief on the projection and the piece of relief in the cavity co-operate with each other to press and crush between them the stack including the cellular core. In analogous manner, the cellular core matches more accurately the shape of the piece of relief in the cavity, so that the second trough is formed accurately and reproducibly. The second piece of relief on the projection defines a second trough in the face of the part that carries the first trough.

Advantageously, at least one of the pieces of relief has a plane side face perpendicular to the leading face or to the end wall, and suitable for extending facing a side face and facing one of the pieces of relief when the projection is received in the cavity.

Thus, the trough face defined by the side face of the piece of relief is plane and perpendicular to the plane of the part, and therefore lends itself to numerous mechanical applications.

Advantageously, two of the pieces of relief have respective plane side faces perpendicular to the leading face or to the end wall and suitable for extending facing each other so that, when the projection is received in the cavity, the two faces are separated from each other by a distance perpendicular to the end wall that is less than the height of at least one of the pieces of relief.

Advantageously, at least one of the pieces of relief has a curved surface zone extending between a side face of the piece of relief, and the end wall of the cavity or the leading face, the curved surface zone being suitable for extending facing one of the pieces of relief when the projection is received in the cavity.

Thus, the curved surface zone and the piece of relief suitable for extending facing it are suitable for pressing the stack including the cellular core so as to give a zone of the part a curved shape having a predetermined radius of curvature corresponding to the radius of curvature of the curved surface zone.

Advantageously, said at least one of the pieces of relief has a plane top perpendicular to the sliding direction.

Thus, the top locally crushes the cellular core to a large extent, thereby improving the accuracy of the shape of the associated trough, and in particular giving the trough a flat end wall parallel to the general plane of the part.

Advantageously, said at least one of the pieces of relief has a width less than the height of the piece of relief.

The pressing stress exerted locally on the core is thus increased.

Advantageously, said at least one of the pieces of relief has an edge contiguous both with a top of the piece of relief and with a side face of the piece of relief, the edge having a radius of curvature less than 0.5 times the height of the piece of relief, and being suitable for extending facing a curved surface zone of the mold when the projection is received in the cavity.

The edge thus defines a corresponding curved surface zone between the end wall and the side face of the trough. The space defined by the trough is thus increased without increasing the width or the depth of said trough.

The invention further provides a method of manufacturing a part comprising a stack including a cellular core, by means of a mold of the invention, in which method the part is formed with the mold at ambient temperature.

In above-mentioned Document DE-3 444 321, the mold includes its own heater means, so that the part is formed at a temperature higher than ambient temperature. Unfortunately, because of the shape of the mold, the various zones of the mold are sometimes heated non-uniformly, which can adversely affect the quality of forming of the part. With the method of the invention, that drawback is avoided. The stack may advantageously be pre-heated prior to being inserted into the mold.

The invention further provides a part in particular for a vehicle, the part comprising a stack including a cellular core, the part being plane in overall shape, and having a first face and a second face that are substantially plane and opposite from each other on either side of the part, the part having a curved surface zone contiguous with the first face and with a rim of the part, and a trough extending in the second face in the vicinity of said rim towards the first face, the rim having a plane external side face that is perpendicular to the first face, and that extends in alignment with the curved surface zone.

This part may be obtained by means of the method of the invention.

Advantageously, the trough has a plane internal side face that is parallel to the external side face of the rim, the internal side face and the external side face being opposite from each other on either side of the rim, and the internal side face constituting an internal face of the rim.

Advantageously, the external and internal side faces of the rim are separated from each other by a distance less than the largest thickness of the part as measured between the first and second faces of the part.

Thus, the rim is particularly thin and robust, and it lends itself reliably to numerous mechanical applications.

Advantageously, the external and internal side faces of the rim are separated from each other by a distance less than the depth of the trough.

Advantageously, the part is provided with a trough extending in the first face towards the second face and in the vicinity of the first trough, the trough in the second face being interposed between the rim of the part and the trough in the first face.

Advantageously, the part is provided with a second trough extending in the second face towards the first face in the vicinity of the first trough, the trough in the first face being interposed between the two troughs in the second face.

Advantageously, at least two of the troughs are separated from each other perpendicularly to the faces of the part by a distance less than the largest thickness of the part as measured between the first and second faces of the part.

Advantageously, said at least one trough has a plane internal side face perpendicular to the faces of the part.

Advantageously, said at least one trough has a flat end wall.

Advantageously, said at least one trough has a curved surface zone extending between an end wall of the trough and a side face of the trough, the zone having a radius of curvature less than 0.5 times the depth of the trough.

Advantageously, the rim is an end rim of the part.

The invention further provides a seat for a motor vehicle, said seat including a part of the invention.

The invention further provides a floor or luggage-compartment panel for a motor vehicle, the panel including a part of the invention.

Other characteristics and advantages of the invention appear from the following description of three preferred embodiments and one variant given by way of non limiting.

SUMMARY OF THE INVENTION

The invention relates to a molded composition stack part (44) for a vehicle. The part has a stack including a cellular core sandwiched between a first face (46) and a second face (48). The part also has a curved surface zone (50) contiguous with the first face (48) and with a rim (54) of the part, and has a trough (52) extending in the second face (48) in the vicinity of the rim towards the first face. The part is characterized in that the rim (54) has a plane external side face (57) that is perpendicular to the first place (46), and that extends in alignment with the curved surface zone (50). Other features are disclosed.

BRIEF DESCRIPTION OF THE DRAWINGS

In the accompanying drawing:

FIG. 4 is a view analogous to FIG. 1 showing the mold in the closed position;

FIG. 5 is a perspective view of the projection on the first portion of the mold;

FIG. 6 is a cross-section view of the stack enabling a part to be made in accordance with the invention;

FIG. 10 is a fragmentary cross-section view of two parts identical to the part shown in FIGS. 7 and 8, showing a preferred example of how the parts are mutually positioned;

FIG. 11 is a fragmentary cross-section view of second embodiment of a forming mold of the invention, in the closed position;

FIG. 12 is a fragmentary cross-section view of a part of the invention manufactured by means of the mold shown in FIG. 11;

FIG. 13 is a fragmentary cross-section view of a motor vehicle seat back of the invention including the part shown in FIG. 12;

FIGS. 14 and 15 are fragmentary cross-section views of a FIG. 12 part forming a floor panel or a luggage compartment panel for a motor vehicle, showing respective ways of installing the part;

DETAILED DESCRIPTION OF THE INVENTION

Figure 1:
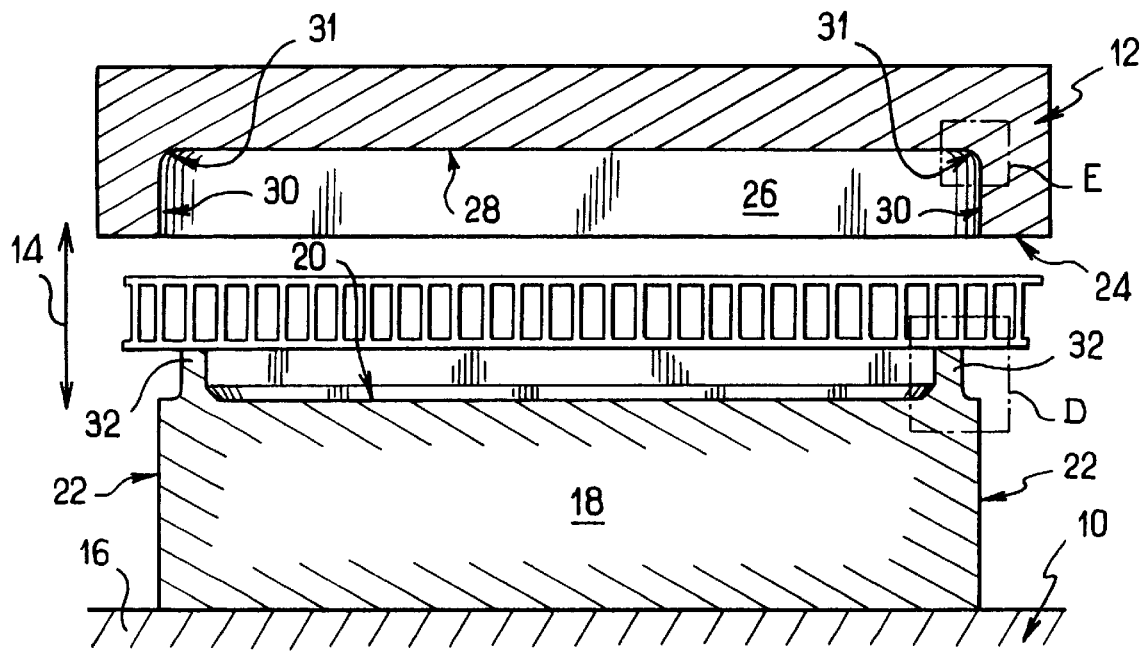
FIG. 1 is a cross-section view of a first embodiment of a forming mold of the invention in the open position.

In a first embodiment of the invention shown in FIGS. 1 to 5, the forming mold is designed to form the composite stack shown in FIG. 6 by pressing, and to assemble together the various layers making up said stack. The stack includes a core 2 made up of cells 4. In this example, the cells are hexagonal in plan shape and they are conventionally honeycombed. The core 2 has two mutually parallel and opposite faces that are perpendicular to the axes of the cells. The stack also includes two skins 6 covering respective ones of the faces of the core. The core 2 and the two skins 6 are made of conventional thermoplastics materials. The stack further includes two woven or non-woven outer covering layers 8 respectively covering the skins 6 and constituting the external faces of the stack. The distance between the two external faces of the stack defines the thickness of said stack. In this example, said thickness is equal to 17 mm.

The mold comprises two mold portions constituted respectively by a punch 10 and by a die 12. These portions are mounted to move in translation relative to each other in the sliding direction indicated by arrow 14. In this example, the punch 10 is fixed. The punch 10 comprises a body 16 and a projection 18 projecting from said body. The projection 18 is substantially rectangular block shaped. It has a plane leading face 20 facing away from the body 16, and perpendicular to the sliding direction, and four plane side faces 22 perpendicular to the plane leading face 20 and defining said leading face. The die 12 has a plane face 24 extending facing the punch. The die is provided with a cavity 26 that is substantially rectangular block shaped and that opens out in said face 24. The cavity 26 has an end wall 28 extending facing and parallel to the plane face 20 of the projection. The cavity also has four plane side faces 30 that are perpendicular to the end wall 28 and that are co-planar with respective ones of the four side faces 22 of the projection 18. The cavity 26 is thus suitable for receiving the projection 18 in part. The mold is organized to make it possible to move the punch and die towards each other until the side faces 30 of the cavity face in part and are in contact with the side faces 22 of the projection when the mold is in the closed position. In the closed position, the plane face 20 of the projection extends at a distance from the end wall 28 of the cavity that is slightly less than the thickness of the stack shown in FIG. 6, so as, in particular, to compress the stack. This distance defines the thickness of the part to be manufactured. In this example, said distance is 16 mm, and the part is thus 16 mm thick when it leaves the mold.

At the end wall, the die 12 is provided with a curved surface zone 31 where the end wall 28 meets each of the side faces 30 of the cavity. The curved surface zone 31 has a profile in the form of a quarter of a circle and it runs on from the end wall 28 and from the side faces 30. In this example, this profile has a radius of curvature R that is less than the thickness of the part (and therefore than the thickness of the stack). Said radius of curvature is advantageously less than 0.7 times said thickness and preferably less than 0.4 times said thickness. In this example, said radius is equal to 5 mm. When the cavity is seen in plan view, the curved surface zone 31 has a generally rectangular continuous elongate shape, the corners of the rectangle being rounded.

Figures 2, 3:
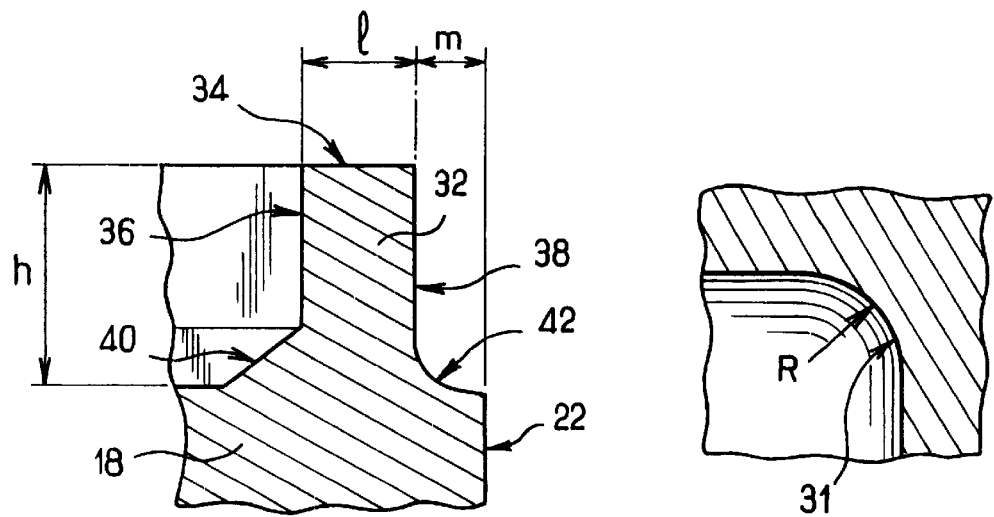
FIG. 2 is an enlarged view of the detail D of FIG. 1.
FIG. 3 is an enlarged view of the detail E of FIG. 1.

The punch 10 is provided with a piece of relief 32 projecting from the plane leading face 20 of the projection, facing the end wall 28 of the cavity. As shown in FIG. 5, the piece of relief has a rectangular continuous elongate plan shape with rounded corners. This shape is similar to the plan shape of the projection. The piece of relief 32 is adjacent to the side faces 22 of the projection. As shown in FIG. 2, the piece of relief has a substantially rectangular cross-sectional shape. It has a plane top 34 parallel to the plane face 20 and to the end wall 28, and its internal and external side faces 36 and 38 are perpendicular to the plane face 20 and to the top 34. The junction between each internal face 36 and the plane face 20 is constituted by a bevel 40. The junction between each external face 38 and the plane face 20 is constituted by a curved surface zone 42 running on from these two faces. The junction between each side face 36, 38 and the top 34 is constituted by an edge having a radius of curvature less than 0.5 times the height h of the piece of relief. Preferably, the edge is substantially right-angled.

The profile of the piece of relief 32 has a height h that is, for example, greater than 0.4 times the thickness of the part, or even greater than 0.7 times said thickness. In this example, the height is equal to the thickness of the part to be manufactured minus the radius of curvature of the zone 31 of the cavity, so that the distance between the piece of relief and the end wall is equal to the radius of curvature. In this example, the height is equal to 12 mm. The profile of the relief has a width 1 less than or equal to its height h. In this example, said width is equal to 5 mm. When the mold is in the closed position, each external face 38 extends facing and parallel to a respective side face 30 of the cavity. The distance between the two faces is then less than the height h of the piece of relief. As seen in FIG. 2, the distance m between the external face 38 of the associated side face 22 of the projection is, for example, less than 0.7 times the thickness of the part, or even less than 0.4 times said thickness. In this example, said distance is equal to the radius of curvature and to the distance between the piece of relief and the end wall, the distance m being equal to 5 mm. The same distance thus separates each external face 38 from the associated side face 30 of the cavity when the mold is in the closed position. In this example, the mold is thus organized so that, when it is in the closed position, the top 34 of the piece of relief is 5 mm from the end wall 28 of the cavity. In this position, the right-angled edge constituting the junction between the top 34 of the piece of relief and each external face 38 is in the position of the center of curvature of the curved surface zone 31, at 5 mm therefrom. The piece of relief 32 is thus located in the vicinity of the curved surface zone 31 when the two mold portions are brought together.

Figure 7:
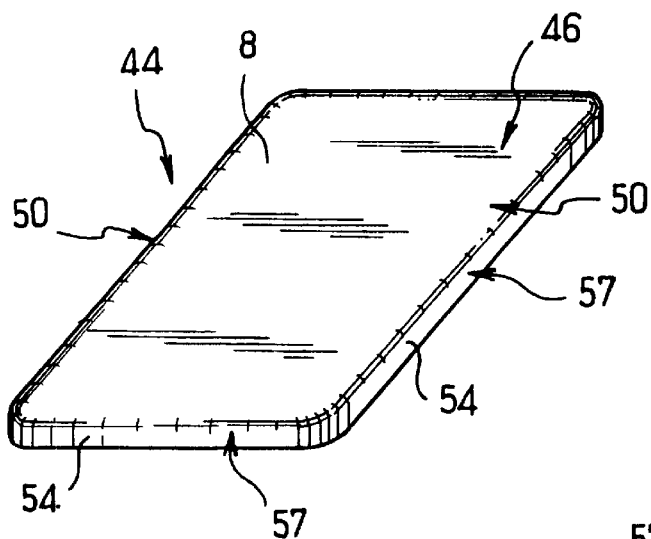
FIGS. 7 and 8 are perspective views of a part of the invention manufactured by means of the mold, the views respectively showing first and second faces of the part.
Figure 8:
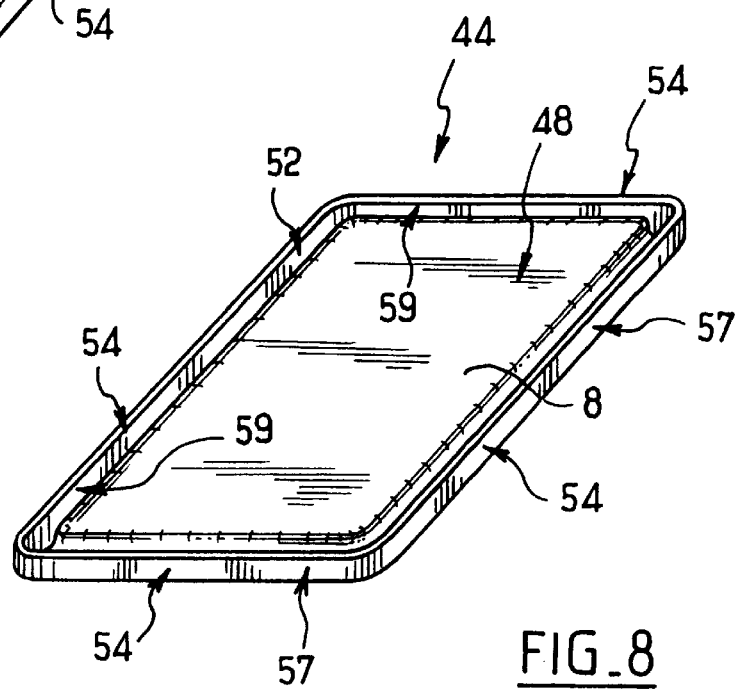

The mold makes it possible to make the part 44 shown in simplified manner in FIGS. 7 and 8; For example, this part may be a back shelf for a vehicle passenger compartment, or a luggage compartment floor.

Firstly, the two skins 6 of the stack are heated to a suitable temperature, e.g. in compliance with the teaching in above-mentioned Document EP-0 649 736 A1. Then the stack shown in FIG. 6 is formed. With the mold being open with the die 12 distant from the punch 10, as shown in FIG. 1, the stack is disposed on the punch, the bottom face of the stack bearing against the top 34 of the piece of relief, the mold being at ambient temperature before the stack is installed in it. The mold is then closed by displacing the die towards the punch. When the side faces 30 of the cavity come into contact with the side faces 22 of the projection as shown in FIG. 4, the faces locally crush the stack and shear off the surplus portions 45 of the stack extending outside the mold. Said surplus portions fall onto the body 16 of the punch. Once the projection is inserted into the cavity, the central region of the stack is pressed between the plane face 20 of the projection and the end wall 28 of the cavity.

Simultaneously, the peripheral regions of the stack are crushed locally in the direction 14 of FIG. 1 between the top of the piece of relief and the end wall of the cavity. Furthermore, the margins of the stack are crushed laterally by being folded down between the external faces 38 of the piece of relief and the side faces 30 of the cavity. On the peripheral regions and the margins, this crushing reduces the thickness of the stack in the crushing direction to about 5 mm. The edges of the part are obtained by crushing the margins in this way. The piece of relief 32 projecting from the plane leading face 20 forces the stack to match the curvature of the curved surface zone 31 of the cavity. The mold may be provided with means for cooling the stack during pressing, as described in the above-described document. Finally, the part is extracted from the mold. Its thickness is equal to 16 mm.

With reference to FIGS. 4, 7, and 8, a substantially flat rectangular part is thus obtained comprising a cellular core, two skins covering two opposite faces of the core, and two covering layers 8 covering the skins. The part has first and second plane faces 46 and 48 that are parallel to each other and opposite from each other, and four rims 54. Around its periphery, it is provided with a curved surface zone 50 adjacent to the first face 46. It is also provided with a set-back 52 or trough adjacent to the second face 48, extending towards the first face and in the vicinity of the curved surface zone 50. The curved surface zone and the trough are generated respectively by the zone 31 of the cavity and by the piece of relief 32, acting in association with each other. In cross-section, the curved surface zone 50 of the part has a radius of curvature equal to the radius of curvature of the curved surface zone 31 of the cavity, and equal to 5 millimeters in this example. The thickness of the part at the trough is equal to the radius of curvature. The curved surface zone 50 and the trough 52 have plan shapes identical respectively to the plan shape of the curved surface zone of the cavity and to the plan shape of the piece of relief. In particular, the trough 52 has a rectangular continuous elongate plan shape. The trough and the zone 50 are adjacent to the rims 54 of the part. The rims are folded back at 90° relative to the general plane of the part, and they are thinner than the thickness of the part, e.g. they are 3 mm or 4 mm thick. The height of the rims is approximately equal to the thickness of the part. The rims 54 have plane external side faces 57 perpendicular to the faces 46 and 48 and extending in alignment with the curved surface zone 50, and running on therefrom.

The trough 52 has an internal side face 59 constituting the internal face of the rim, which face is parallel to the external side face 57 of the rim 54 and on the opposite side thereof from said external side face.

The external side face and the internal side face of the rim are separated from each other by a distance less than the largest thickness of the part as measured between the first and second faces of the part.

In addition, the external side face and the internal side face of the rim are separated from each other by a distance that is less than the depth of the trough.

Thus, the trough 52 has two plane internal side faces perpendicular to the faces 46 and 48 of the part. The trough has a flat end wall.

In addition, the trough has a curved surface zone extending between the end wall and that side face 59 of the trough which is associated with the rim, this zone having a radius of curvature less than 0.5 times the depth of the trough.

The rim 54 is an end rim of the part.

The mold of the invention thus makes it possible to manufacture a part having a cellular core while forming curved surface zones, each of which has a radius of curvature less than the thickness of the part.

Figure 9:
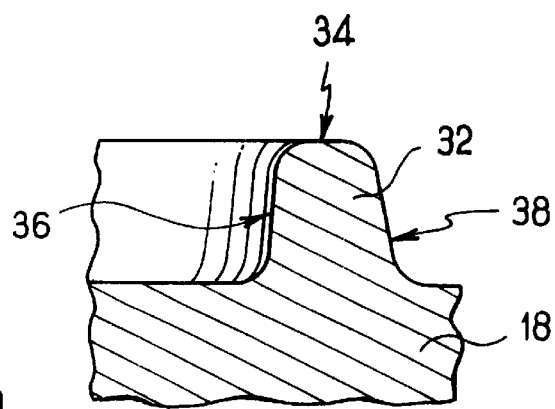
FIG. 9 is a view analogous to FIG. 2 showing a variant embodiment of the mold.

FIG. 9 shows a variant embodiment of the mold. The cross-section of the piece of relief 32 is substantially trapezium-shaped, the base of the piece of relief being constituted by that one of the two parallel sides of the trapezium which is wider than the other. In addition, the top 34 of the piece of relief has a rounded profile extending in alignment with the side faces of the piece of relief. The top has one side extending towards the edge of the projection (the right side in the figure), and a side extending away from said edge (the left side in the figure). The side extending towards the edge of the projection has a radius of curvature that is larger than the side extending away from said edge. This variant reduces the risk of splits starting on the composite structure during forming. The top of the piece of relief may be rounded only on the side extending towards the edge of the projection.

As shown in FIG. 10, it is possible, for example, to use two mutually identical parts 44 by disposing them side-by-side with their longitudinal rims 54 having their external side faces 57 in mutual surface-to-surface contact, the curved surface zones 50 facing each other and being mutually contiguous, the faces 46 and 48 of the two parts being respectively mutually co-planar. The resulting juxtaposition is acceptable in appearance because the two curved surface zones 50 are contiguous, as indicated by the dashed-line circle. In addition, the external side faces 57 of the rims 54 ensure that the two parts are positioned accurately and reliably relative to each other.

A second embodiment of the mold is shown in FIG. 11. The mold comprises a punch and a die that are substantially identical to those of the first embodiment. A first difference is that the zone 40 constituting the junction between the leading face 20 of the projection and the internal side face 36 of the piece of relief 32 is curved, like the zone 42 on the other side of the piece of relief.

Furthermore, the die 12 is provided with a piece of relief 132 projecting from the end wall 28. This piece of relief has a shape and proportions that are generally identical to those of the piece of relief 32 on the projection except that the piece of relief 132 has a plan shape that is smaller than that of the piece of relief 32, the plan shape of the piece of relief 132 being similar to that of the piece of relief 32. The profiles of the pieces of relief 32 and 132 are identical in shape and in dimensions. The piece of relief 132 has an internal side face 136 and an external side face 138, the external side face extending at a distance from the internal side face 30 of the cavity that is greater than the distance 1+m between the internal side face 36 of the piece of relief 32 and the internal side face 30 of the cavity, and advantageously lying in the range 3×1 to 4×1. The piece of relief 132 is suitable for extending in the vicinity of the piece of relief 32 of the projection 18 when the projection is received in the cavity, so that the piece of relief 32 of the projection is interposed between the piece of relief 132 of the cavity and the side face 30 of said cavity. The external side face 138 of the piece of relief 132 is then facing and at a distance from the internal side face of 36 of the piece of relief 32. In this position, these two faces are separated by a distance perpendicular to the end wall 28 that is less than the height h. In this position, the curved surface zone 40 of the piece of relief 32 faces that edge of the top of the piece of relief 132 which is associated with the external side face 138.

The mold makes it possible to form a part 44 as shown in FIG. 12 from a stack such as the stack shown in FIG. 6. This part is substantially identical to that shown in FIGS. 7 and 8, but it is provided with a trough 152 extending in the first face 46 towards the second face 48 in the vicinity of the first trough 52, the trough 52 being interposed between the rim 54 and the trough 152. In addition, the two pieces of relief have locally crushed the stack between them so that the trough 152 has a flat end wall parallel to the general plane of the part, and two plane side faces perpendicular to said end wall. The two troughs are separated from each other perpendicularly to the general plane of the part by a distance d less than the largest thickness e of the part as measured between the faces 46 and 48.

A part 44 of this type may be part of a seat proper or a seat back 60 of a motor vehicle, as shown in FIG. 13. The seat back shown includes a block of synthetic cellular foam 62 disposed against the face 48. The seat back includes a fabric cover 64 disposed to cover all of the sides of the block of foam 62 except for the side associated with the part 44. The cover 64 is provided with a circumferential shaped-section gasket made of a plastics material and fixed to the edge of the fabric. The gasket is fixed to the seat back by being forced into the trough 152 over the entire length thereof, i.e. over the four segments thereof. The cover 64 covers the rim 154 of the part 44, in particular the external side face 157, thereby hiding it from view.

FIG. 14 shows the part 44 as used to form a panel for the luggage compartment or for the passenger compartment of a motor vehicle. The vehicle includes a structural element 66 defining a shoulder which is rectangular in plan shape and on which part 44 is placed, with face 46 facing away from the shoulder. The shoulder is provided with a rectilinear longitudinal rib or projection 68 on an abutment face parallel to the general plane of the part, which rib penetrates into trough 152. A counter-plate 70 fixed to the element 66 and in contact therewith is then disposed in the vicinity of face 46. The counter-plate 70 is also provided with a rectilinear longitudinal rib or projection 72 designed to penetrate into the trough 152. The counter-plate masks the rim 154 of the part from view. The part 44 is thus fixed and positioned accurately without having to drill it or glue it.

FIG. 15 shows an analogous configuration in which the shoulder of the element 66 is not provided with a rib. The part 44 is disposed on the shoulder as above, one of the troughs 152 of the part receiving a pin 72 fixed to the element 66 so as to implement a link via which the part 44 can pivot relative to the element 66.

Figure 16:
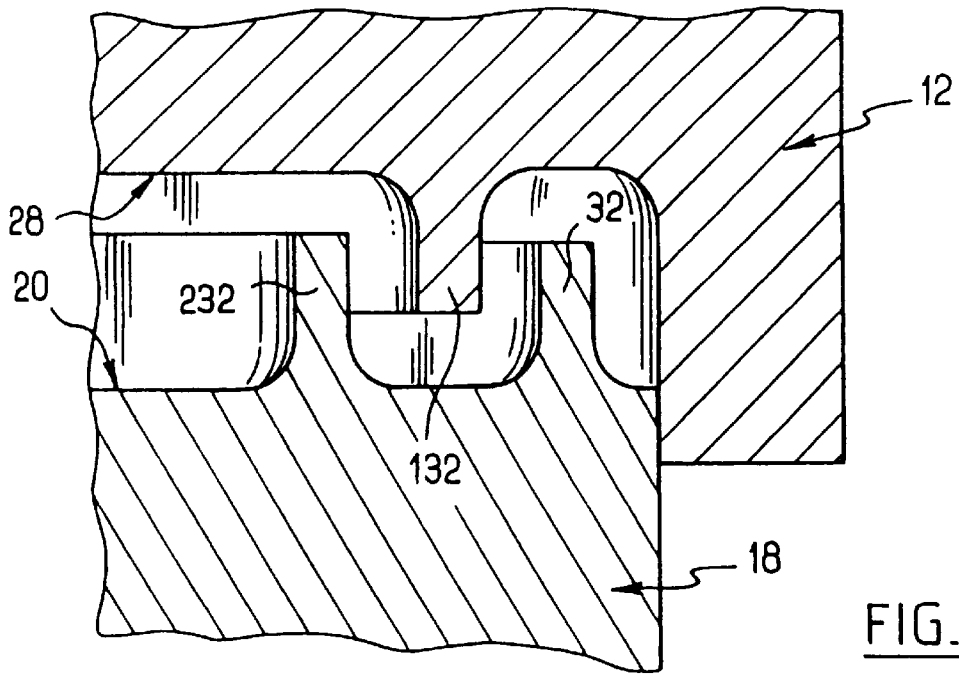
FIG. 16 is a fragmentary cross-section view of a third embodiment of a forming mold of the invention, in the closed position.

FIG. 16 shows a third embodiment of the mold. In this embodiment, the projection 18 is provided with a second piece of relief 232 projecting from the leading face 20, and disposed in the vicinity of the first piece of relief 32 on the projection. The second piece of relief has a profile that is the same shape and of the same dimensions as the profile of the first piece of relief 32. Its plan shape is similar to that of the first piece of relief. It is disposed so that, when the projection 18 is received in the cavity 26, the piece of relief 132 of the cavity is interposed between the pieces of relief 32 and 232 on the projection so that it is equidistant therebetween.

Figure 17:
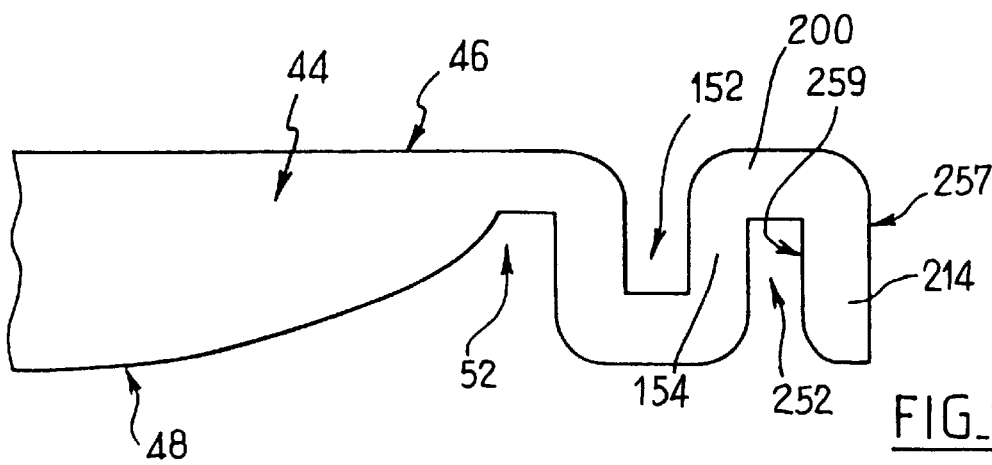
FIG. 17 is a fragmentary cross-section view of a part of the invention manufactured by means of the mold.

FIG. 17 shows a part 44 made by means of the mold. The trough 152 has a flat end wall parallel to the general plane of the part, and side faces perpendicular to said end wall. In addition, said part is provided with a second trough 252 extending in the second face 48 towards the first face 46 in the vicinity of the first trough 52, the trough 152 being interposed between the troughs 52 and 252. The distance between the troughs 52 and 152 is identical to the distance between the troughs 152 and 252.

Figure 18:
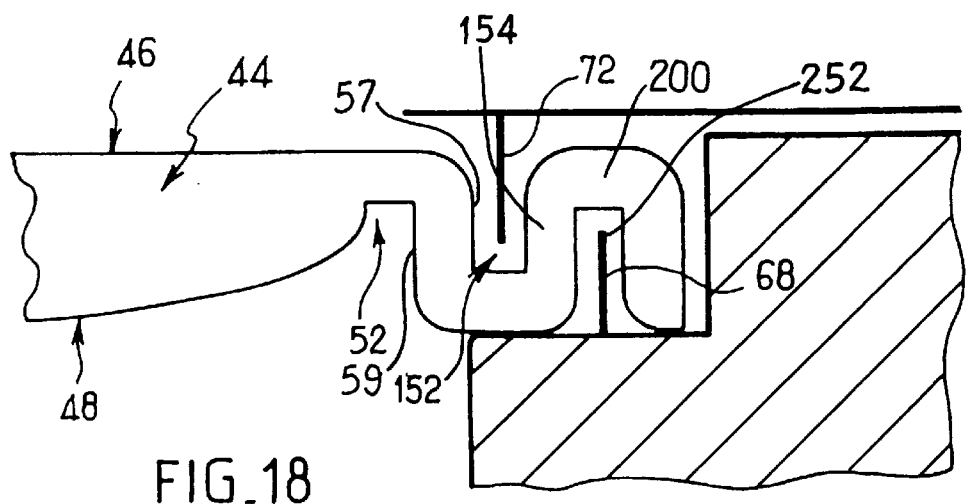
FIG. 18 is a fragmentary cross-section view of a part as shown in FIG. 17 constituting a floor panel or a luggage compartment panel for a motor vehicle, showing how the part may be installed.

The part 44 may be used in a configuration of the type shown in FIG. 18 that is analogous to the configuration shown in FIG. 14. In FIG. 18, the face 46 faces away from the shoulder, the rib 68 is received in the trough 152, and the rib 72 is received in the trough 152. The part 44 makes it possible to implement a small-sized shoulder in the plane of the part.

The part of the invention may in particular be used in any type of land vehicle, sea craft or aircraft.

I claim:

1. A part (44) in particular for a vehicle, the part (44) comprising:
    a stack including a cellular core having a first side that opposes a second side, the part being plane in overall shape, and having a first face (46) attached to the first side of the cellular core and a second face (48) attached to the second side of the cellular core, wherein the first face (46) and the second face (48) are substantially plane and face in opposite directions from each other on either side of the part, the part further having
    a curved surface zone (50) contiguous with the first face (48) and with a rim (54) of the part, and
    at least one trough (52) extending in the second face (48) in the vicinity of the rim towards the first face, wherein the rim (54) includes a plane external side face (57) that is perpendicular to the first face (46) and extends in alignment with the curved surface zone (50).

2. The part of claim 1, wherein the rim (54) is an end rim of the part.

3. A floor panel for a motor vehicle, wherein the floor panel includes a part according to claim 1.

4. A luggage-compartment panel for a motor vehicle, wherein the luggage-compartment panel includes a part according to claim 1.

5. The part of claim 1, wherein the at least one trough (52) includes a plane internal side face (59) that is parallel to the external side face (57) of the rim, the internal side face and the external side face being opposite from each other on either side of the rim, and the internal side face constituting an internal face of the rim.

6. The part of claim 5, wherein the external and internal said faces (57, 59) of the rim (54) are separated from each other by a distance of less than the largest thickness (e) of the part as measured between the first and second faces of the part.

7. The part of claim 5, wherein the external and internal side faces (57, 59) of the rim (54) are separated from each other by a distance less than the depth of the at least one trough (52).

8. The part of claim 1, wherein the part is provided with a first trough (152) extending in the first face (46) towards the second face (48) and in the vicinity of the at least one trough (52), the first trough (152) in the second face being interposed between the rim (54) of the part and the at least one trough (52) in the first face.

9. The part of claim 8, wherein the part is provided with a second trough (252) extending in the second face (48) towards the first face (46) in the vicinity of the first trough, the trough (152) in the first face being interposed between the at least one trough (52) and the second trough (252) in the second face.

10. The part of claim 8 or 9, wherein at least two of the troughs (52, 152, 252) are separated from each other perpendicularly to the faces of the part by a distance (d) less than the largest thickness (e) of the part as measured between the first and second faces of the part.

11. The part of any one of claims 1, 8, or 9, wherein the at least one trough (52) includes a plane internal side face perpendicular to the faces of the part.

12. The part of any one of claims 1, 8 or 9, wherein the at least one trough (52) includes a flat end wall.

13. The part of any one of claims 1, 8 or 9, wherein the at least one trough (52) includes a curved surface zone extending between an end wall of the at least one trough (52) and a side face of the at least one trough (52), the curved surface zone having a radius of curvature less than 0.5 times the depth of the at least one trough (52).

* * * * *

UNITED STATES PATENT AND TRADEMARK OFFICE
CERTIFICATE OF CORRECTION

PATENT NO. : 6,050,630
DATED : 4-18-2000
INVENTOR(S) :
Hochet

It is certified that error appears in the above-identified patent and that said Letters Patent is hereby corrected as shown below:

On the Title Page

In [57], line 1, delete "stack part (44 )" and insert -- stack part (44) -- .

In column 5, line 13, delete "non limiting" and insert -- non-limiting examples -- .

In column 5, line 23, delete "perpendicular to the first place" and insert -- perpendicular to the first face -- .

In column 5, line 27, delete "accompanying drawing:" and insert -- accompanying drawings: -- .

In column 10, line 12, delete "and the trough 152." and insert -- and the second face 48. -- .

In column 11, line 11, delete "the trough 152" and insert -- the trough 252 -- .

In column 12, line 5, delete "external and internal said faces" and insert -- external and internal side faces -- .

Signed and Sealed this

Twenty-second Day of May, 2001

Attest:

NICHOLAS P. GODICI

Attesting Officer

Acting Director of the United States Patent and Trademark Office